(12) United States Patent
Skinner et al.

(10) Patent No.: US 11,264,913 B2
(45) Date of Patent: Mar. 1, 2022

(54) APPARATUS AND METHODS FOR USE IN A RESONANT CONVERTER

(71) Applicant: TDK-LAMBDA UK LIMITED, Devon (GB)

(72) Inventors: Andrew John Skinner, Devon (GB); Carlos Toyos Bada, Bristol (GB)

(73) Assignee: TDK-LAMBDA UK LIMITED, Devon (GB)

( * ) Notice: Subject to any disclaimer, the term of this patent is extended or adjusted under 35 U.S.C. 154(b) by 0 days.

(21) Appl. No.: 16/962,127

(22) PCT Filed: Jan. 14, 2019

(86) PCT No.: PCT/GB2019/050094
§ 371 (c)(1),
(2) Date: Jul. 14, 2020

(87) PCT Pub. No.: WO2019/138251
PCT Pub. Date: Jul. 18, 2019

(65) Prior Publication Data
US 2020/0412260 A1 Dec. 31, 2020

(30) Foreign Application Priority Data

Jan. 15, 2018 (GB) ..................................... 1800642
Oct. 30, 2018 (GB) ..................................... 1817720

(51) Int. Cl.
*H02M 3/335* (2006.01)
*H02M 3/00* (2006.01)
*H02M 1/00* (2006.01)

(52) U.S. Cl.
CPC ......... *H02M 3/33569* (2013.01); *H02M 3/01* (2021.05); *H02M 3/33571* (2021.05); *H02M 1/0058* (2021.05)

(58) Field of Classification Search
CPC ....... H02M 1/0058; H02M 2001/0058; H02M 3/01; H02M 7/4815; H02M 3/335; H02M 3/33569; H02M 3/33571
See application file for complete search history.

(56) References Cited

U.S. PATENT DOCUMENTS 6,326,740 B1    12/2001  Chang
7,149,068 B2 *  12/2006  Adragna ................. H02M 1/36
                                                     361/92

(Continued)

FOREIGN PATENT DOCUMENTS

EP    0430358 A1    6/1991
EP    2458723 A1    5/2012

OTHER PUBLICATIONS

International Search Report; International Patent Application No. PCT/GB2019/050094; TDK-LAMBDA UK Limited; dated May 20, 2019.

(Continued)

*Primary Examiner* — Gary L Laxton
(74) *Attorney, Agent, or Firm* — Gurr Brande & Spendlove, PLLC; Robert Dan Spendlove

(57) ABSTRACT

An apparatus (21) is described for facilitating emulated current-mode control of a resonant converter (1). The apparatus (21) comprises: an input (21) a for a first signal suitable for use in determining a phase of a resonant current, wherein the resonant current corresponds to a current in a resonant network (3) of the converter (1); an input (21b) for a second signal suitable for use in determining a target phase difference between the resonant current and a driving voltage, wherein the driving voltage corresponds to a voltage provided by a switch network (2) of the converter (1) to the resonant network (3); one or more outputs (21c, 21d) for one or more control signals for controlling operation of the switch network (2); and circuitry (21e-i). The circuitry (Continued)

(21*e-i*) is configured to: use the first signal in determining a first value, wherein the first value is related to a phase difference between the resonant current and the driving voltage; use the second signal in determining a second value, wherein the second value is related to the target phase difference; and set the one or more control signals based at least in part on a comparison of the first and second values, wherein the one or more control signals are for causing the phase difference to track the target phase difference.

20 Claims, 7 Drawing Sheets

(56) References Cited

U.S. PATENT DOCUMENTS

| | | | |
|---|---|---|---|
| 2014/0016365 A1* | 1/2014 | Maruyama | H02M 3/33507 363/21.02 |
| 2015/0003117 A1 | 1/2015 | Ferrazza | |
| 2015/0194896 A1* | 7/2015 | Stuler | H02M 3/33523 363/21.02 |

OTHER PUBLICATIONS

Written Opinion of the International Searching Authority; International Patent Application No. PCT/GB2019/050094 TDK-LAMBDA UK Limited; dated May 20, 2019.

* cited by examiner

APPARATUS AND METHODS FOR USE IN A RESONANT CONVERTER

CROSS-REFERENCE TO EARLIER APPLICATION

This application is a § 371 National Stage Entry of PCT/GB2019/050094 filed Jan. 14, 2019 entitled "Apparatus for Use in a Resonant Converter," which application claims priority to GB Application Nos. 1817720.4 filed Oct. 30, 2018 and 1800642.9 filed Jan. 15, 2018. The entire content of these applications is incorporated herein by reference in its entirety.

FIELD

The application relates, amongst other things, to apparatus and methods for use in a resonant converter. Certain aspects relate to apparatus for facilitating emulated current-mode control of a resonant converter.

BACKGROUND

Resonant dc-dc converters such as those based on LLC series circuits are of interest, not least because of their high efficiencies.

Such converters can be difficult to control, especially over a wide operating range. This is at least partly due to the inherently non-linear nature of resonant converters which makes them have a frequency-response transfer function that changes with operating point. Known techniques for controlling resonant dc-dc converters include average current-mode control, peak current-mode control, and charge control. See, for example, Park et al, 'Average Current-mode Control for LLC Series Resonant dc-dc Converters', Journal of Power Electronics, vol. 14, no. 1, p. 40-47, 2014; Jang et al 'Current-mode Control for LLC Series Resonant dc-dc Converters', Energies vol. 8, no. 6, p. 6098-6113, 2015; and 'AN-6104. LLC Resonant Converter Design using FAN7688 (rev 1.0)', Fairchild Semiconductor Corporation, 16 Sep. 2015.

However, these techniques can have certain disadvantages. For example, average current-mode control generally has a relatively limited bandwidth due to the averaging process, while peak current-mode control and charge control involves signals that generally become undetectable at low loads.

SUMMARY

According to a first aspect of the present invention, there is provided apparatus for facilitating emulated current-mode control of a resonant converter, the apparatus comprising:
  an input for a first signal suitable for use in determining a phase of a resonant current, wherein the resonant current corresponds to a current in a resonant network of the converter;
  an input for a second signal suitable for use in determining a target phase difference between the resonant current and a driving voltage, wherein the driving voltage corresponds to a voltage provided by a switch network of the converter to the resonant network;
one or more outputs for one or more control signals for controlling operation of the switch network; and
  circuitry configured to:

use the first signal in determining a first value, wherein the first value is related to a phase difference between the resonant current and the driving voltage;
  use the second signal in determining a second value, wherein the second value is related to the target phase difference; and
  set the one or more control signals based at least in part on a comparison of the first and second values, wherein the one or more control signals are for causing the phase difference to track the target phase difference.

Thus, the apparatus can provide an alternative way of controlling a resonant converter and which also has several advantages over known techniques—for example, a higher bandwidth.

The apparatus is typically used in an 'inner loop' of a converter, wherein an 'outer loop' senses an output level of the converter and produces a signal corresponding to the second signal. Together, the outer and inner loops can cause the output level of the converter to track a target output level.

The second signal may be indicative of a target output current of the converter. The circuitry may be configured to determine the second value in accordance with a known relationship between the output current and the phase difference between the resonant current and the driving voltage. Thus, the apparatus can be used with an outer loop that produces a current demand signal.

Alternatively, the second signal may be indicative of the target phase difference.

The first value may correspond to the phase difference, and the second value may correspond to the target phase difference. The phase differences may be numerically represented by the values in any suitable way.

References herein to phase (rather than phase difference) refer to phase relative to an arbitrary common reference.
the first signal may be indicative of the timing of zero-crossings of the resonant current. Such a signal is particularly convenient for determining the phase of the resonant current.

The apparatus may comprise means for obtaining a second signal suitable for use in determining the phase of the driving voltage.

The circuitry may be configured to determine the first value using the first signal and at least one of the one or more control signals. The apparatus may make use of control signals in determining the phase of the driving voltage.

Alternatively, the apparatus may comprise an input for a third signal suitable for use in determining a phase of the driving voltage, and the circuitry may be configured to determine the first value using the first signal and the third signal.

The circuitry may be configured to determine the first value based on: a value indicative of a time difference between a zero-crossing of the resonant current and a zero-crossing of the driving voltage; and a value indicative of the period of the resonant current and the driving voltage. The circuitry may be configured to determine the value indicative of the period in accordance with a frequency of operation of the switch network set by the circuitry. These operations can be performed particularly quickly and/or efficiently.

The circuitry may be configured to adjust the value indicative of the time difference so as to overestimate a time lag of the resonant current with respect to the driving voltage. The circuitry may be configured to determine the first value based on the adjusted value indicative of the time difference. This can introduce negative feedback to counteract the effect of timing errors.

The circuitry may configured to constrain the second value to a particular range. The range may correspond to a phase lag of the resonant current with respect to the driving voltage being greater than zero. Thus, hard switching can be automatically avoided.

The one or more control signals may be suitable for changing an operating frequency and/or a duty cycle of the switch network. Thus, the phase difference can be changed in several different ways.

The circuitry may comprise a microcontroller. The circuitry may comprise at least one processor and non-transitory memory storing computer programme code. the computer programme code, when executed by the at least one processor, may cause the circuitry to set the one or more control signals. Thus, the apparatus can be provided in an efficient way.

There may be provided a resonant converter with control circuitry comprising:
  an inner loop comprising the apparatus; and
  an outer loop configured to sense an output level of the converter and to produce a signal corresponding to the second signal,
  wherein the inner and outer loops cause an output level of the converter to tend towards a target output level.

According to a second aspect of the present invention, there is provided a method suitable for use in a resonant converter, the method comprising:
  obtaining a first signal or value suitable for use in determining timing of a resonant current, wherein the resonant current corresponds to a current in a resonant network of the converter;
  obtaining a second signal or value suitable for use in determining timing of a driving voltage, wherein the driving voltage corresponds to a voltage provided by a switch network of the converter to the resonant network;
  using the first signal or value and the second signal or value in determining at least one third value related to a time difference between the resonant current and the driving voltage; and,
  in response to the at least one third value meeting one or more criteria, at least partly overriding one or more control signals, wherein the one or more control signals are for controlling operation of the switch network and are otherwise determined so as to set (e.g. regulate) an output of the resonant converter.

Thus, the method can be a particularly fast-acting way of monitoring a resonant converter and modifying the output of the resonant converter in appropriate circumstances. For example, as will be explained below, the method enables high-speed over-current protection.

The high speed of operation is at least partly enabled by the use of the time difference between the resonant current and the driving voltage. Such a time difference is highly responsive to changes in relation to the resonant converter and can also be determined (and used) rapidly.

The time difference between the resonant current and the driving voltage may also be described as the time offset or the time lag of one of these waveforms relative to the other. The time offset or time lag is preferably determined for corresponding points on the waveforms (e.g. points of maximum rate of decrease). As will be appreciated, the resonant network is operated in an inductive mode and so the resonant current lags the driving voltage.

The one or more criteria may include the at least one third value indicating that the time difference is less than a minimum time difference. This indicates that the resonant network is close to being in a capacitive mode.

The one or more criteria may include the at least one third value indicating that the time difference has decreased by at least a particular amount in a particular period of time (in other words, that the time difference has decreased at at least a particular rate). Such a change can be indicative of a short circuit or the like.

Overriding the one or more control signals may comprise changing the one or more control signals so as to increase the time difference and/or reduce the output of the resonant converter. The output may be reduced to a particular output level, e.g. approximately zero.

Overriding the one or more control signals may comprise changing the one or more control signals so as to incrementally increase a switching frequency of the switch network (e.g. by increasing the switching frequency or decreasing the switching period by a particular amount). The switching frequency may be incrementally increased (up to a maximum switching frequency) whenever a third value indicates that the time difference has decreased by at least the particular amount in the particular period of time.

The switching frequency may be increased or the switching period may be decreased by different amounts depending on the amount by which the time difference has decreased.

Overriding the one or more control signals may comprise setting the one or more control signals so as to set a switching frequency of the switch network to a particular frequency (e.g. a maximum switching frequency).

The method may comprise, in response to the at least one third value meeting a further criterion, stopping overriding the one or more control signals. The further criterion may correspond to the at least one third value indicating that the time difference has increased by a particular amount in a particular period of time (in other words, that the time difference has increased at at least a particular rate).

Stopping overriding the one or more control signals may comprise changing the one or more control signals so as to incrementally decrease a switching frequency of the switch network.

The particular period of time may correspond to a switching period of the switch network.

The first signal or value may be indicative of timing of zero-crossings of the resonant current. The second signal or value may be indicative of timing of falling or rising edges of the driving voltage.

The method may comprise:
  obtaining a fourth value related to a target phase difference between the resonant current and the driving voltage;
  using the first signal or value and the second signal or value in determining a fifth value related to a phase difference between the resonant current and the driving voltage; and
  setting the one or more control signals based at least in part on a comparison of the fourth and fifth values.

Thus, the method can be readily used in combination with a way of controlling a resonant converter such as that provided by the apparatus according to the first aspect of the present invention (see above).

The method may comprise:
  obtaining a sixth signal or value indicative of a target output current of the converter; and determining the fourth value in accordance with a known relationship between the output current and the phase difference between the resonant current and the driving voltage.

According to a third aspect of the present invention, there is provided apparatus configured to perform a method according to the second aspect.

The apparatus may comprise:
an input for each of the first and second signals;
an output for each of the one or more control signals; and
circuitry configured to perform the method.

The circuitry may comprise at least one microcontroller. The circuitry may comprise at least one processor and non-transitory memory storing computer programme code, wherein the computer programme code, when executed by the at least one processor, causes the circuitry to perform the method.

There may be provided a resonant converter comprising:
inner and outer loops; wherein the outer loop is configured to sense an output level of the resonant converter and to provide a demand signal to the inner loop, and the inner loop is configured to use the demand signal in determining the one or more control signals; and
the apparatus, wherein the apparatus is at least partly comprised in the inner loop.

According to a fourth aspect of the present invention, there is provided a method for use by apparatus for facilitating emulated current-mode control of a resonant converter, the apparatus comprising an input for a first signal suitable for use in determining a phase of a resonant current, wherein the resonant current corresponds to a current in a resonant network of the converter, an input for a second signal suitable for use in determining a target phase difference between the resonant current and a driving voltage, wherein the driving voltage corresponds to a voltage provided by a switch network of the converter to the resonant network, and one or more outputs for one or more control signals for controlling operation of the switch network, the method comprising:
using the first signal in determining a first value, wherein the first value is related to a phase difference between the resonant current and the driving voltage;
using the second signal in determining a second value, wherein the second value is related to the target phase difference; and
setting the one or more control signals based at least in part on a comparison of the first and second values, wherein the one or more control signals are for causing the phase difference to track the target phase difference.

According to a fifth aspect of the present invention, there is provided a non-transitory computer-readable storage medium storing a computer programme comprising instructions that, when executed by one or more processors, cause the one or more processors to perform the method according to the second or fourth aspect.

BRIEF DESCRIPTION OF THE DRAWINGS

Certain embodiments of the present invention will now be described, by way of example, with reference to the accompanying drawings, in which.

DETAILED DESCRIPTION OF THE CERTAIN EMBODIMENTS

A Dc-Dc Resonant Converter

Referring to FIGS. 1 to 10 an example of a resonant dc-dc converter 1 (hereinafter referred to as simply a 'converter') will now be described.

Figure 1:
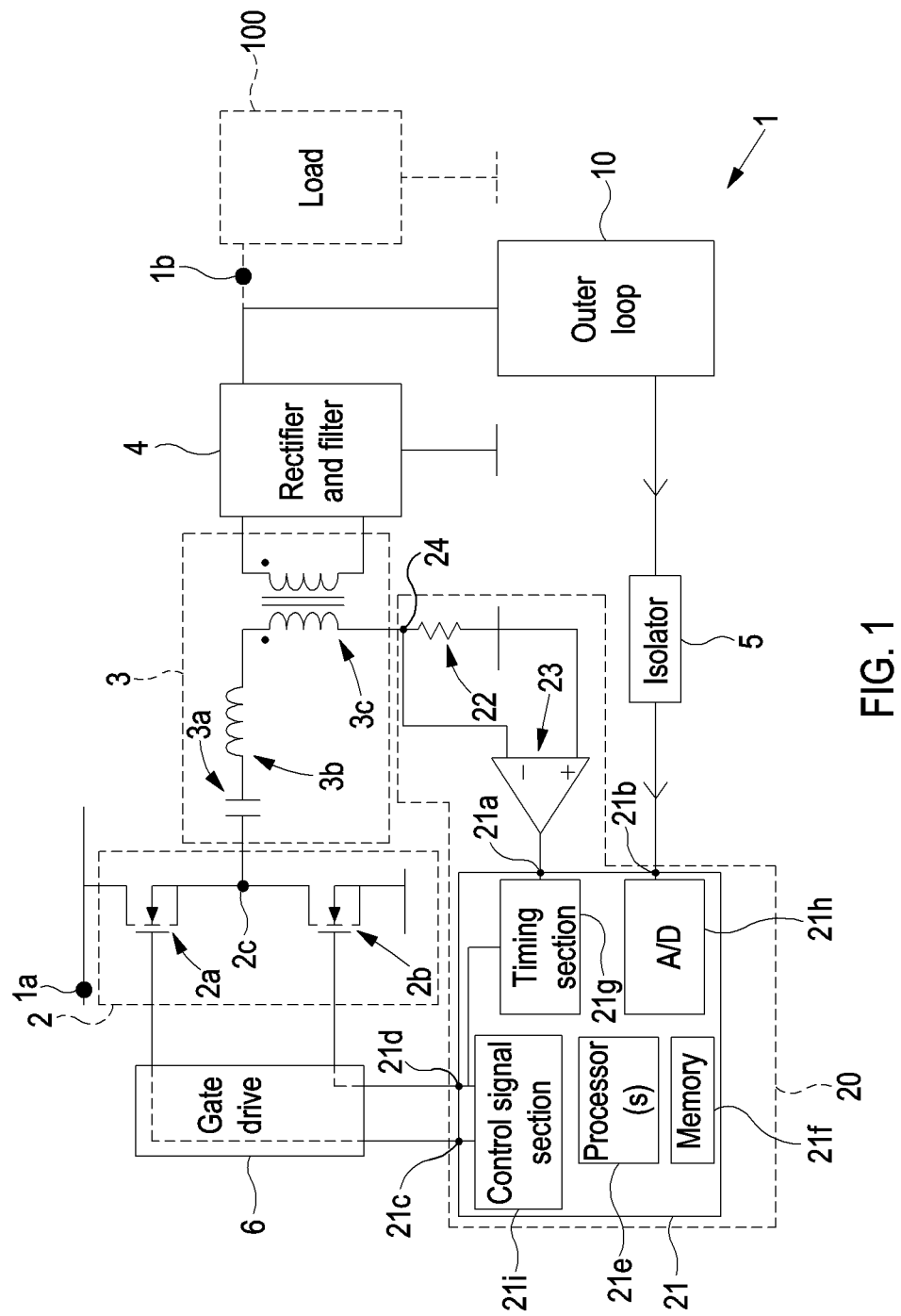
FIG. 1 schematically illustrates an example of a resonant converter.

Referring in particular to FIG. 1, the converter 1 includes an input 1a (hereinafter referred to as the 'main input'), a switch network 2 connected to the main input 1a, a resonant network 3 connected to the switch network 2, a rectifier and filter section 4 connected to the resonant network 3, and an output 1b (hereinafter referred to as the 'main output') connected to the rectifier and filter section 4.

The converter 1 further includes two sets of circuitry 10, 20 (hereinafter referred to as the 'outer loop' and the 'inner loop') for emulating current-mode control of the converter 1.

A dc input (with a voltage hereinafter referred to as the 'input voltage') may be provided to the main input 1a. A load 100 (with an impedance hereinafter referred to as the 'load impedance') may be connected to the main output 1b. The main output 1b provides a dc output (with a voltage hereinafter referred to as the 'output voltage' and a current hereinafter referred to as the 'output current'). As will be appreciated, the input voltage and/or the load impedance may vary. In this example, the converter 1 seeks to provide a dc output with a particular output voltage (hereinafter referred to as the 'voltage setpoint').

The switch network 2 will now be described in more detail.

In this example, the switch network 2 has a half-bridge configuration. However, the switch network 2 may be different and, for example, may have a full-bridge configuration.

The switch network 2 has two switches 2a, 2b (hereinafter referred to as 'first' and 'second' switches). The first and second switches 2a, 2b may be metal-oxide-semiconductor field-effect transistors (MOSFETs). The first switch 2a has its drain terminal connected to the main input 1a and its source terminal connected to a node 2c (hereinafter referred to as the 'midpoint'). The second switch 2b has its drain terminal connected to the midpoint 2c and its source terminal connected to ground.

As will be explained in more detail below, the first and second switches 2a, 2b are switched alternately on and off. Hence the voltage at the midpoint 2c corresponds to a square wave (this voltage is hereinafter referred to as the 'driving voltage' and its frequency is hereinafter referred to as the 'switching frequency').

The resonant network 3 will now be described in more detail.

In this example, the resonant network 3 corresponds to an LLC series circuit. However, the resonant network 3 may be different and, for example, may have different and/or differently-arranged elements.

The resonant network 3 includes a capacitor 3a, an inductor 3b and a transformer 3c. The transformer 3c has primary and secondary windings. The capacitor 3a, the inductor 3b and the primary winding of the transformer 3c are connected in series (in any order) between the midpoint 2c of the switch network 2 and ground. The inductor 3b and the transformer 3c may be provided as two separate components or they may be integrated into a single component. In addition, a resistor 22 (which is part of the inner loop 20) is connected between the primary winding of the transformer 3c and ground.

The capacitance of the capacitor 3a and the inductances of the inductor 3b and the primary winding of the transformer 3c at least partly determine the response of the resonant network 3 to the driving voltage. In particular, these values at least partly determine the current (hereinafter referred to as the 'resonant current') through the resonant network 3 in response to the driving voltage. The resonant current through the primary winding of the transformer 3c induces a voltage in the secondary winding.

The rectifier and filter section 4 will now be described in more detail.

In this example, the rectifier and filter section 4 has two inputs. One of these inputs is connected to one end of the secondary winding of the transformer 3c, and the other one of the inputs is connected to the other end of the secondary winding. However, the rectifier and filter section 4 may be connected to the secondary winding of transformer 3c in any suitable way. Hence the rectifier and filter section 4 receives an ac input from the transformer 3c.

The rectifier and filter section 4 may include any suitable rectifier and filter circuitry. The filter circuitry may include, amongst other things, a capacitor (hereinafter referred to as the 'output capacitor').

The rectifier and filter section 4 has an output connected to the main output 1b. Hence the rectifier and filter section 4 provides a dc output corresponding to that of the main output 1b.

The outer loop 10 will now be described in more detail.

The outer loop 10 produces a signal (hereinafter referred to as the 'current demand signal') which depends on the output voltage and the voltage setpoint. In this example, the current demand signal is an analogue signal.

Accordingly, the outer loop 10 has an input connected to the main output 1b of the converter 1 for sensing the output voltage.

The outer loop 10 also includes suitable circuitry to define the voltage setpoint. In other examples, the voltage setpoint may be defined differently and, for example, may be defined by a signal provided to the outer loop 10.

The outer loop 10 also has an output connected, via an isolator 5, to the inner loop 20. The isolator 5 transfers the current demand signal from the outer loop 10 to the inner loop 20. In doing so, the isolator 5 may change the amplitude of the current demand signal. The isolator 5 may be of any suitable type, e.g. an opto-isolator.

The outer loop 10 (with the isolator 5) is configured to produce a suitable current demand signal—in particular, a signal with an amplitude indicative of a target output current for causing the output voltage to tend to the voltage setpoint. Determining a target output current typically involves determining an error based on the difference between the output voltage and the voltage setpoint and then determining a target output current based on this error. The current demand signal may be determined in any suitable way using any suitable circuitry. See, for example, Park et al, 'Average Current-mode Control for LLC Series Resonant dc-dc Converters', Journal of Power Electronics, vol. 14, no. 1, p. 40-47, 2014.

The inner loop 20 will now be described in more detail.

The inner loop 20 includes a controller 21. In this example, the controller 21 corresponds to a microcontroller, although the controller 21 may be of any suitable type and may include any suitable analogue and/or digital circuitry. The controller 21 may include one or more suitably-programmed general-purpose elements.

The controller 21 includes two inputs 21a, 21b (hereinafter referred to as 'first' and 'second' inputs) and two outputs 21c, 21d (hereinafter referred to as 'first' and 'second' outputs). The controller 21 also includes at least one processor 21e and memory 21f. The memory 21f includes non-volatile memory storing computer programme code which, when executed by the processor 21e, causes the processor 21e to operate as described herein. The controller 21 also includes several peripherals, e.g. a timing section 21g, an analogue-to-digital (A/D) converter 21h and a control signal section 21i.

The first input 21a is connected to the resonant network 3 for detecting the timing (and hence phase) of the resonant current. In this example, this involves detecting the timing of zero-crossings of the resonant current. Accordingly, the inner loop 20 includes a resistor 22 (described above) and a comparator 23. The comparator 23 has one of its inputs connected to ground and the other of its inputs connected to a node 24 between the primary winding of the transistor 3c and the resistor 22. Hence the comparator 23 produces a signal (hereinafter referred to as the 'resonant current timing signal') with edges that are coincident with the zero-crossings of the resonant current. The first input 21a is connected to the comparator 23 to receive the resonant current timing signal therefrom.

The second input 21b is connected to the isolator 5 to receive the current demand signal therefrom.

The first output 21c is connected, via a gate drive section 6, to a gate terminal of the first switch 2a, and the second output 21d is similarly connected to the second switch 2b. The gate drive section 6 may include any suitable gate drive circuitry. The first and second outputs 21c, 21d are for providing signals (hereinafter referred to as the 'first' and 'second' control signals) for controlling switching of the first and second switches 2a, 2b, respectively.

In this example, the timing section 21g determines the time differences between edges of the driving voltage and zero-crossings of the resonant current.

Accordingly, the timing section 21g is connected to the first input 21a to receive the resonant current timing signal.

The timing section 21g may determine the timing of edges of the driving voltage based on the first and/or second control signals. In other words, the first and/or second control signals are taken as representative of the driving voltage. In this example, the second control signal is used.

Figure 2A:
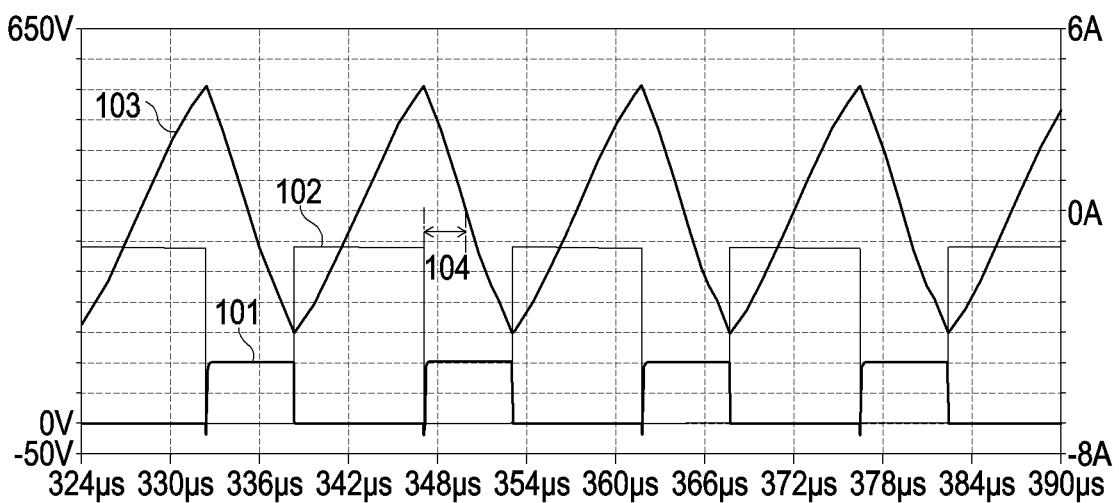
FIGS. 2A and B shows simulated traces corresponding to a control signal, driving voltage and resonant current for a converter of the type shown in FIG. 1 under a relatively low load (A) and a relatively high load (B)
Figure 2B:
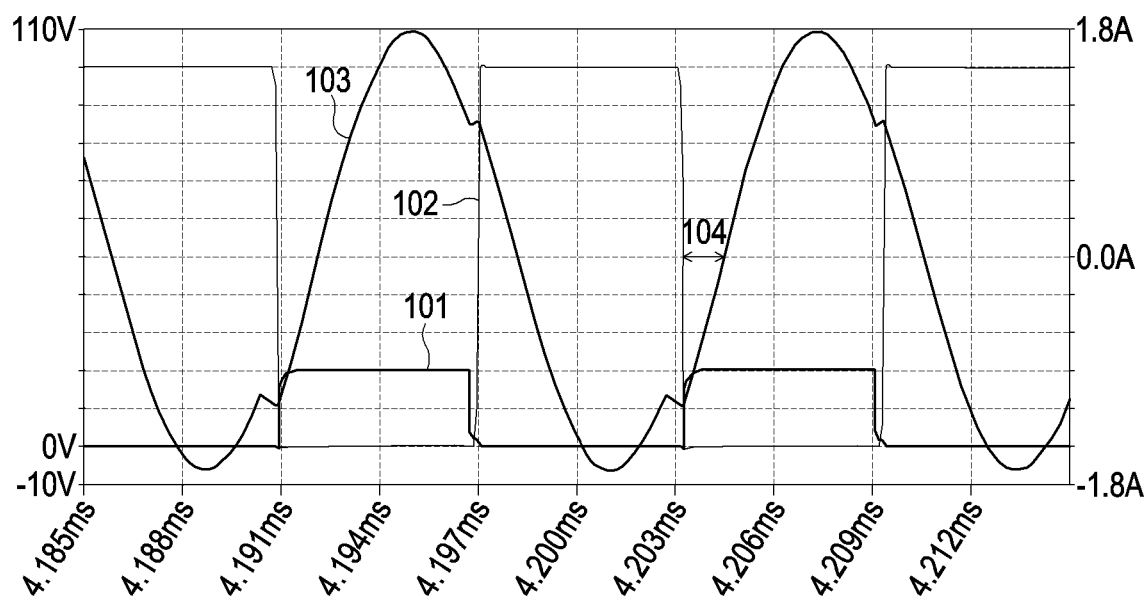

The rising edges of the second control signal correspond to falling edges of the driving voltage (see e.g. FIGS. 2A and B). Hence, in this example, the timing section 21g is connected to the second output 21c to sense the second control signal. In other examples, the timing section 21g may use different signals/data relating to the first and/or second control signals.

The timing section 21g detects edges (in particular, the falling edges) of the resonant current timing signal (corresponding to downwards zero-crossings of the resonant current) and rising edges of the second control signal (corresponding to falling edges of the driving voltage). The timing section 21g determines, for example, a time lag of each downwards zero-crossing of the resonant current with respect to each falling edge of the driving voltage. The timing section 21g outputs a digital signal (hereinafter referred to as the 'time difference signal'). The time difference signal is made up of values (hereinafter referred to as 'time difference values') each of which is indicative of a time lag as defined above. The time lags may be numerically represented by the time difference values in any suitable way. One time difference value may be determined for each period of the driving voltage/resonant current (i.e. each switching period).

FIGS. 2A and B show various simulated traces for a converter of the type described herein under a relatively low load and a relatively high load, respectively. In each figure, a trace 101 corresponds to the second control signal, another trace 102 corresponds to the driving voltage and another trace 103 corresponds to the resonant current, while the time lag of the downwards zero crossing of the resonant current with respect to the falling edge of the driving voltage is illustrated by an arrow 104. As can be seen, under a relatively low load, the time lag corresponds to about a quarter of the switching period (i.e. the phase difference is almost 90°). Under a relatively high load, the time lag corresponds to about an eighth of the switching period (i.e. the phase difference is about 45°).

The A/D converter 21h is connected to the second input 21b to receive the current demand signal. The A/D converter 21h converts the current demand signal from an analogue to a digital version. The amplitude of the analogue version of the current demand signal may be numerically represented in the digital version in any suitable way.

Phase-Mode Control Operations

Figure 3:
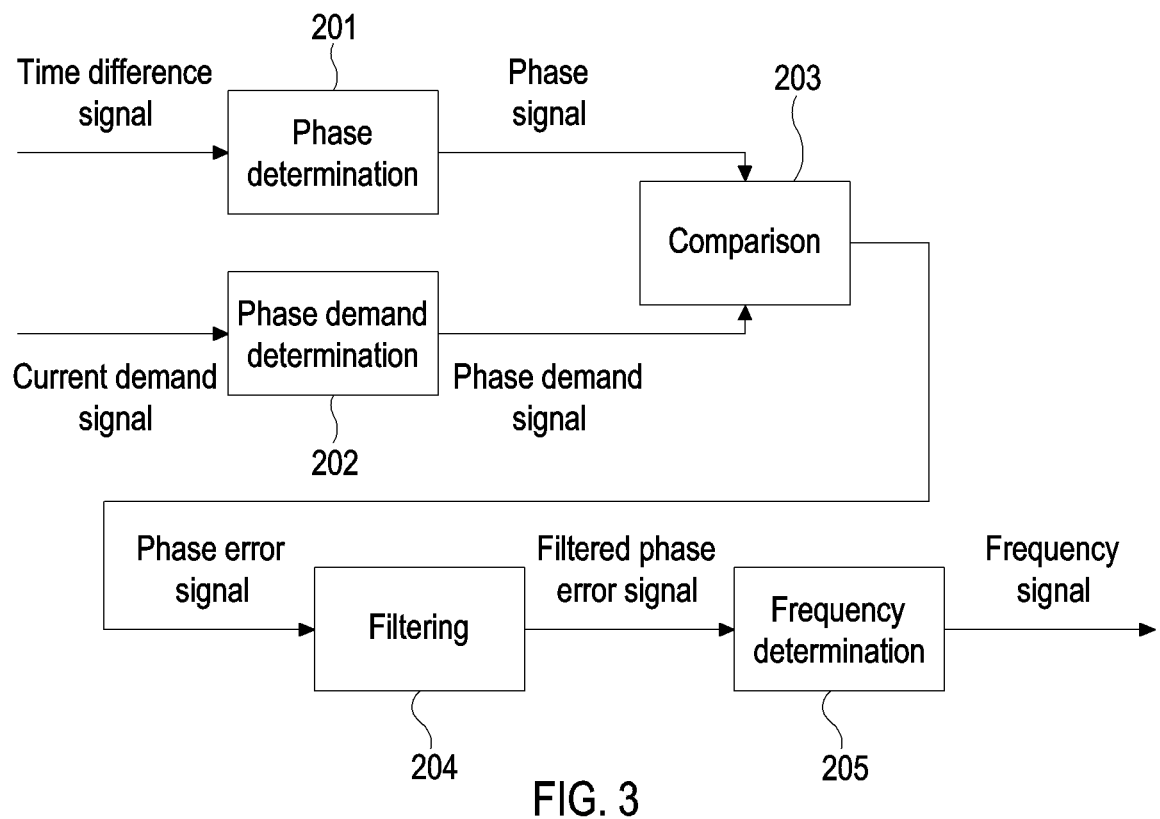
FIG. 3 schematically illustrates a first set of operations performed by a controller in the converter of FIG. 1.

Referring in particular to FIG. 3, the processor 21e performs a first set of operations based on the time difference signal and the digital version of the current demand signal. These operations (hereinafter referred to as 'phase-mode control operations') are illustrated schematically by the blocks 201-205.

In brief, the phase-mode control operations involve converting the current demand signal to a so-called phase demand signal which is then used to adjust the phase difference between the resonant current and the driving voltage.

At a first block 201, the processor 21e uses the time difference signal to determine a further signal (hereinafter referred to as the 'phase signal'). The phase signal is made up of values each of which is indicative of the phase difference between the resonant current and the driving voltage (these values are hereinafter referred to as 'phase values').

In determining the phase signal, the processor 21e also uses values indicative of the period of the driving voltage/resonant current. As will be explained in more detail below, the processor 21e sets the switching frequency of the switch network 2 and this corresponds to the frequency of the driving voltage/resonant current Hence, the processor 21e may use a recently-set value of switching frequency.

The processor 21e may determine phase values using an equation of the form:

$$\Phi = (T_d + T_{comp}) \times 360/T. \qquad \text{(Equation 1)}$$

$\Phi$ is the phase difference (in degrees) between the resonant current and the driving voltage (hereinafter sometimes referred to as the 'relevant phase difference'). $T_d$ is a time lag as defined above (i.e. a time lag of a downwards zero-crossing of the resonant current with respect to a falling edge of the driving voltage). $T_{comp}$ is a compensation term. T is the period of the driving voltage/resonant current.

The processor 21e may use a compensation term (e.g. $T_{comp}$ in Equation 1) when determining phase values so as to overestimate rather than underestimate the relevant phase difference. This is because, if a measured time lag is too low, then the calculated phase difference is also too low and the error in the phase difference increases with increasing switching frequency, thus disadvantageously introducing positive feedback. The compensation term artificially increases the calculated phase difference such that the error in the phase difference increases with increasing frequency, thus introducing negative feedback to counteract the effect of timing errors.

The relevant phase difference may be numerically represented by the values in any suitable way and with any suitable scaling. For example, a phase difference of 90° may be represented by a (16-bit integer) value of 16,384. Such an approach can provide suitably high resolution.

The relevant phase difference is preferably defined to be positive when the resonant current lags the driving voltage. This definition is generally used herein.

At a second block 202, the processor 21e uses the digital version of the current demand signal to produce the phase demand signal. The phase demand signal is made up of values each of which is indicative of a target phase difference between the resonant current and the driving voltage.

Figure 4:
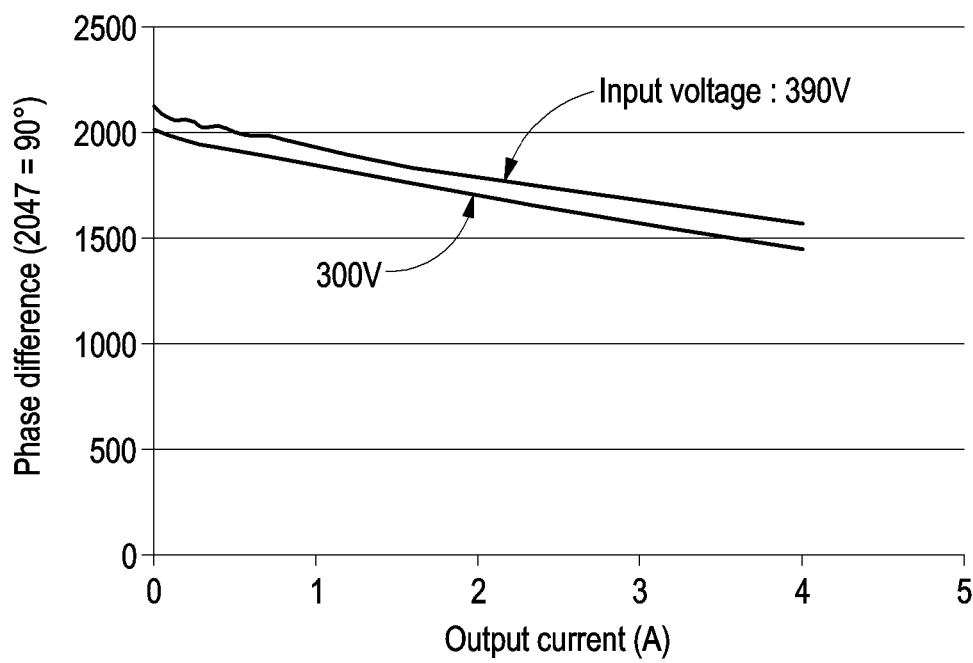
FIG. 4 shows measured phase difference as a function of output current for a converter of the type shown in FIG. 1.

FIG. 4 shows the results of measurements of phase difference as defined above (i.e. phase lag of the resonant current with respect to the driving voltage) as a function of output current for a converter of the type described herein. The measurements were performed at constant input voltage, i.e. 300 V or 390 V. It can be seen that the phase difference is an approximately linear function of output current. Hence this shows that the phase difference can be effective in emulating current-mode control of such a converter.

The processor 21e determines the phase demand signal from the current demand signal using a suitable function (hereinafter referred to as the 'phase demand function'). For example, the phase demand function may be a linear function with coefficients determined based on measurements (such as those described above in relation to FIG. 4), simulations or calculations.

The same numerical representation is preferably used for the target phase difference as for the phase difference. The numerical representation preferably allows the target phase difference to be greater than +90° (for example 110°), due at least in part to the compensation term used when determining the phase values.

The processor 21e may also include a mechanism to force the switching frequency to a particular value, e.g. the maximum switching frequency, under particular conditions, e.g. when a target phase difference cannot be achieved. This can have the effect of limiting the output current and/or stopping an output voltage overshoot. In relation to an overshoot, an increasing output voltage should be stopped as quickly as possible. Using phase-mode control as described herein to limit the overshoot may take too long and so may lead to an out-of-specification overshoot. In contrast, by forcing the switching frequency to a maximum as described above, an overshoot voltage can be stopped almost immediately. An overshoot can be detected by detecting that the phase demand signal has remained below a particular value for a predetermined period of time.

The processor 21e may further modify the phase demand signal. For example, the processor 21e may constrain the phase demand signal to a particular range. This range may correspond to phase difference as defined above (i.e. phase lag of the resonant current with respect to the driving voltage) being greater than zero and, in particular, greater than a minimum phase difference. The minimum phase difference may be, for example, 20°. Such a value also accounts for the compensation term used when determining the phase values. Constraining the phase demand signal in this way can ensure that the switch network 2 generally remains in a soft switching state, and that the power stage (i.e. the resonant network 3, etc.) of the converter 1 remain inductively loaded. Hence the controller 21 can be used to avoid hard switching, even without knowledge of the resonant frequencies of the resonant network 3.

Referring to FIG. 3 again, at a third block 203, the processor 21e compares the phase signal with the phase demand signal to produce a further signal (hereinafter referred to as the 'phase error signal'). The phase error signal may correspond to the difference between the phase signal and the phase demand signal.

At a fourth block 204, the processor 21e filters the phase error signal to produce a further signal (hereinafter referred to as the 'filtered phase error signal'). In this example, the filter corresponds to a low-pass filter. However, the filter may have any suitable transfer function.

At a fifth block 205, the processor 21e determines a further signal (hereinafter referred to as the 'frequency signal') based on the filtered phase error signal. The frequency signal is made up of values each of which is indicative of an switching frequency that minimises the filtered phase error signal and hence causes the phase difference to track the target phase difference.

Accordingly, the processor 21e functions like a controller such as a proportional-integral controller with an input signal corresponding to the filtered phase error signal and an output signal corresponding to the frequency signal. The associated coefficients (e.g. the coefficients for the proportional and integral terms) may be determined in any suitable way.

The processor 21e may further modify the frequency signal. For example, the processor 21e may constrain the frequency signal to a range between upper and lower limits corresponding to maximum and minimum switching frequencies, respectively. This can improve reliability of the converter 1.

Referring to FIG. 1 again, the processor 21e provides the frequency signal to the control signal section 21i.

The control signal section 21i generates the first and second control signals, i.e. the signals for controlling switching of the first and second switches 2a, 2b, respectively. In this example, the first and second control signals each correspond to a square wave with a ~50% duty cycle. The first and second control signals both have the same frequency, i.e. the switching frequency. The first and second control signals are in antiphase. The control signal section 21i functions like a controllable oscillator setting the switching frequency based on the frequency signal.

Hence the inner loop 20, by varying the switching frequency, causes the relevant phase difference to follow the target phase difference and, because the relevant phase difference is related (approximately proportionally) to the output current, the inner loop 20 causes the output current to follow (suitably well) the target output current determined by the outer loop 20. Thus, the outer and inner loop 10, 20 together maintain the output voltage at the voltage setpoint.

Results Relating to the Phase-Mode Control Operations

Referring to FIGS. 5 to 8, the results of several tests on converters of the type described herein will now be described.

Figure 5:
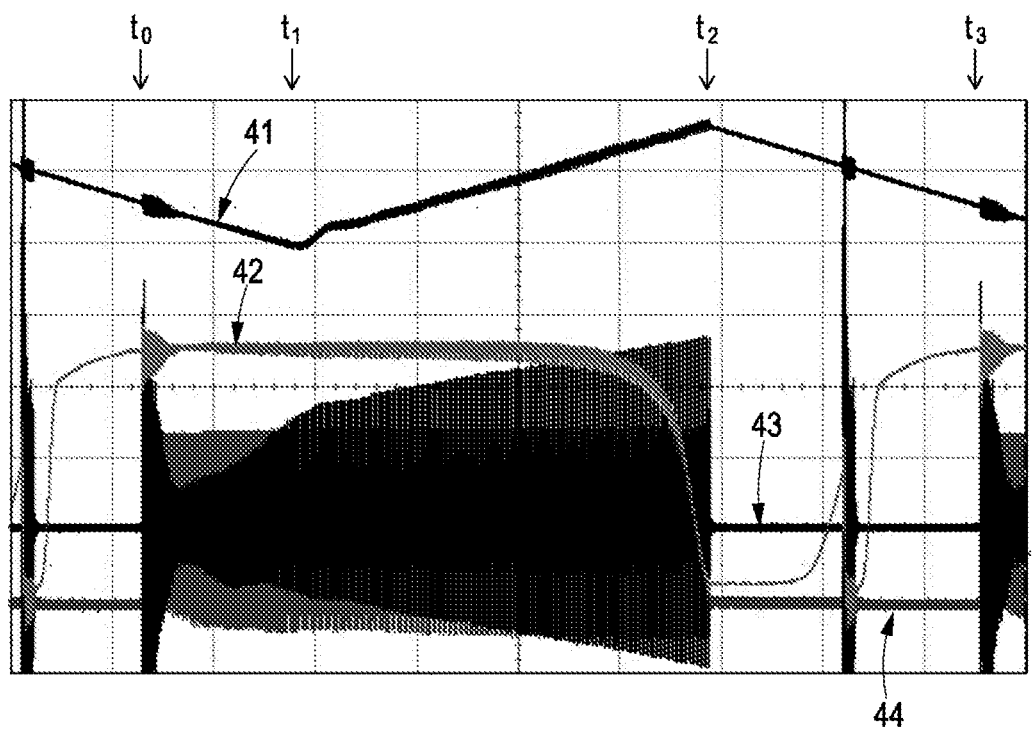
FIG. 5 shows several traces for a converter of the type shown in FIG. 1.

FIG. 5 shows various traces for a converter operated with a fixed phase demand signal and a fixed output current A first trace 41 corresponds to the output voltage. A second trace 42 corresponds to a further feedback signal. A third trace 43 corresponds to the resonant current A fourth trace 44 corresponds to a ('gate drive') signal provided to the gate of the second switch 2b.

Each horizontal division represents a time period of 640 µs.

It can be seen that, between times $t_1$ and $t_2$, the output voltage 41 rises linearly, corresponding to a constant current charging the output capacitor. Hence this shows that a constant phase demand signal can produce an approximately constant output current.

In this instance, the converter has a protection mechanism that stops the converter when the further feedback signal 42 falls below ~0.1 V. This occurs at time $t_2$.

Following re-start of the converter, i.e. at times $t_0$ and $t_3$, the resonant current exhibits only a relatively small overshoot. This shows a system with a well-damped characteristic.

Figure 6:
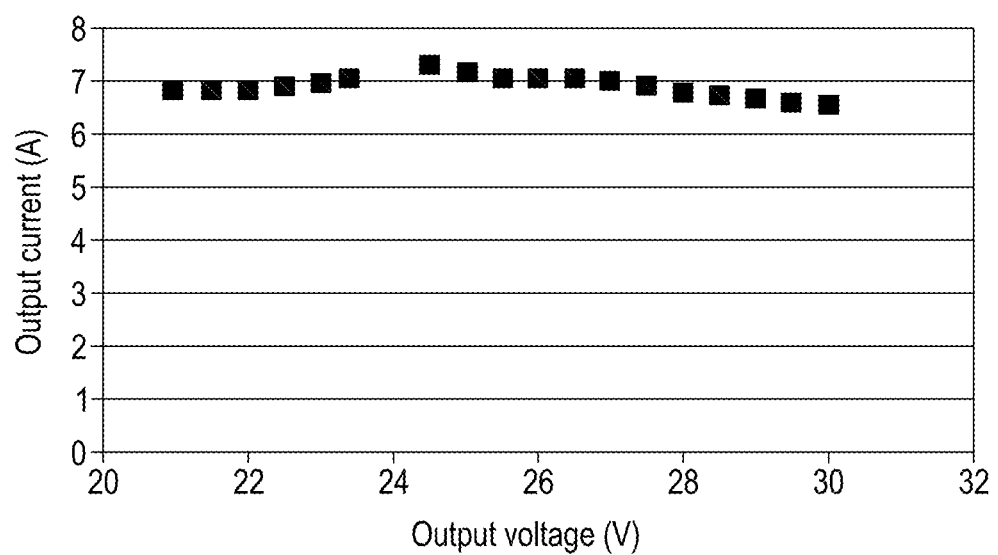
FIG. 6 shows measured output current versus output voltage for a converter of the type shown in FIG. 1 operated with a fixed phase demand signal.

FIG. 6 shows output current versus output voltage for a converter operated with a fixed phase demand signal. It can be seen that the output current is approximately constant regardless of the output voltage. This shows that a constant phase demand can emulate a constant current with sufficient accuracy for the purposes of implementing a control loop.

Figure 7:
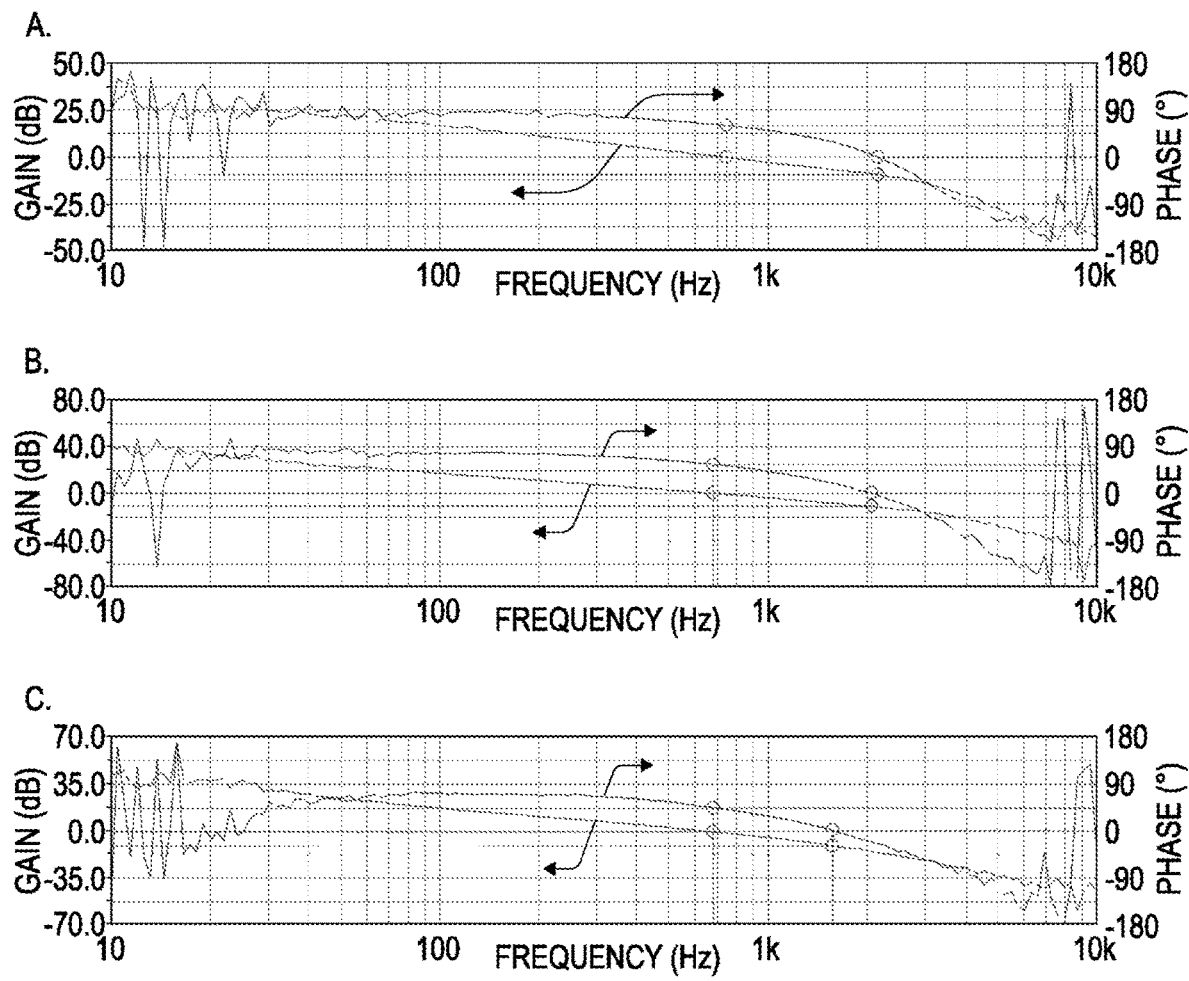
FIG. 7 show Bode plots at different load currents (A: 12 A, B: 2.0 A, C: 1.0 A) for a resonant network in a converter of the type shown in FIG. 1.

FIG. 7 shows Bode plots of the transfer function of the outer loop 10 (i.e. phase shift and gain versus frequency for output voltage versus current/phase demand signal). Results are shown for a converter operated with a fixed input voltage of 350 V, a fixed output voltage of 24 V, and three different load impedances and hence output currents, i.e. (a) 12 A, (b) 2.0 A and (c) 1.0 A.

It can be seen that the response is similar for a relatively wide range of output powers, i.e. 24 W to 288 W.

It can also be seen that there is consistently a −20 dB/decade roll-off of the gain, a gain crossover frequency of ~700 Hz (and hence a suitably bandwidth, i.e. frequency range in which the system can reject disturbances), and values of gain margin of 60° and phase margin of ~10 dB (indicative of a stable and slightly-underdamped system).

Figure 8:
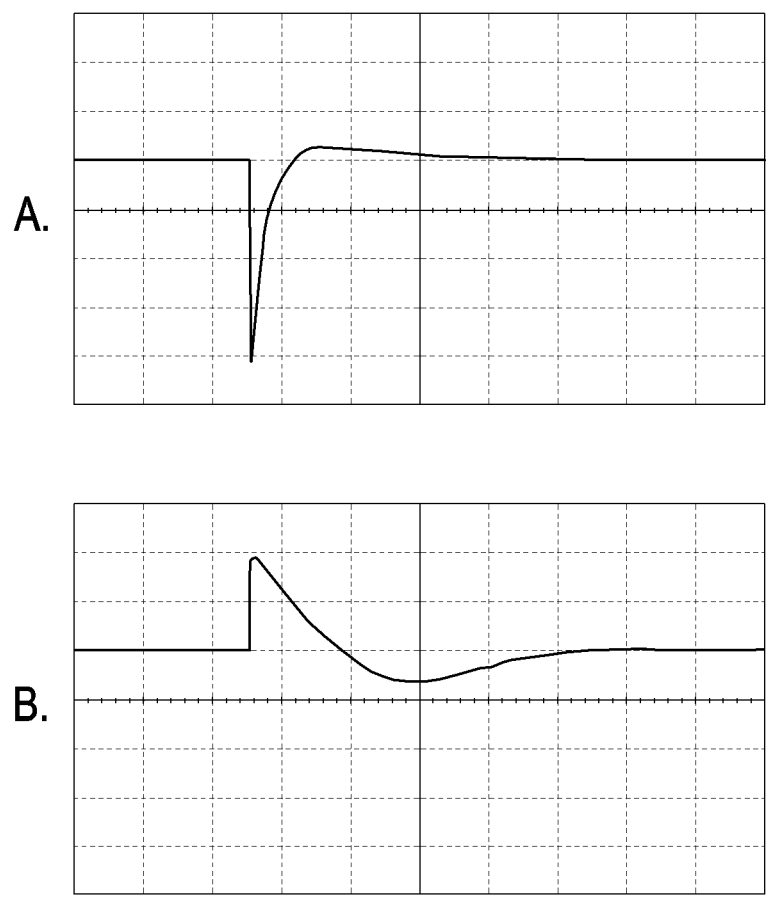
FIG. 8 shows a response of an output voltage to a step change in load current (A: from 0 to 12 A, B from 12 to 0 A) for a converter of the type shown in FIG. 1.

FIG. 8 shows the transient response of output voltage to a step change in load impedance and hence load current, i.e. (a) from 0 to 12 A and (b) from 12 to 0 A. Each horizontal division represents a time period of 20 ms.

It can be seen that, in both instances, the recovery of the output voltage is characteristic of a slightly underdamped system (Q<1). It can also be seen that both recoveries are particularly smooth, clean and monotonic. This is in contrast to, for example, voltage-mode control, wherein different compensation laws interfere and produce temporary deviations during the recovery.

Advantages of the Phase-Mode Control Operations

In brief, it has been shown that the phase difference between the resonant current and the driving voltage can be used as an inner loop control variable in emulated current-mode control of a resonant dc-dc converter. This approach, i.e. phase-mode control), can provide several advantages.

In particular, the inventors have shown (e.g. through circuit simulation) that the relevant phase difference is a fast-changing signal compared, for example, to the signals used in average current-mode control or peak current-mode control. Thus, phase-mode control can allow the bandwidth of the inner loop and hence the outer loop to be increased and hence the performance of the converter to be improved.

Furthermore, it has been shown that phase-mode control (like conventional current-mode control) can result in a first-order system, for example akin to a current source driving a capacitor. Such a system is relatively easy to stabilise.

Furthermore, because phase-mode control involves detecting the phase of the resonant current rather than, for example, its peak, it can avoid a disadvantage of some conventional current-mode control techniques, namely that the signals may become undetectable at low load.

Some further advantages of phase-mode control (e.g. automatically avoiding hard switching) have been described above.

Moreover, these various advantages can be achieved without significant increases in manufacturing cost. This is due, in particular, to the control functionality being relatively easy to manage (e.g. to programme). Such control functionality can also minimise the introduction of delays and hence phase shifts and so can also allow for higher bandwidths.

Optional Override Operations

Figure 9:
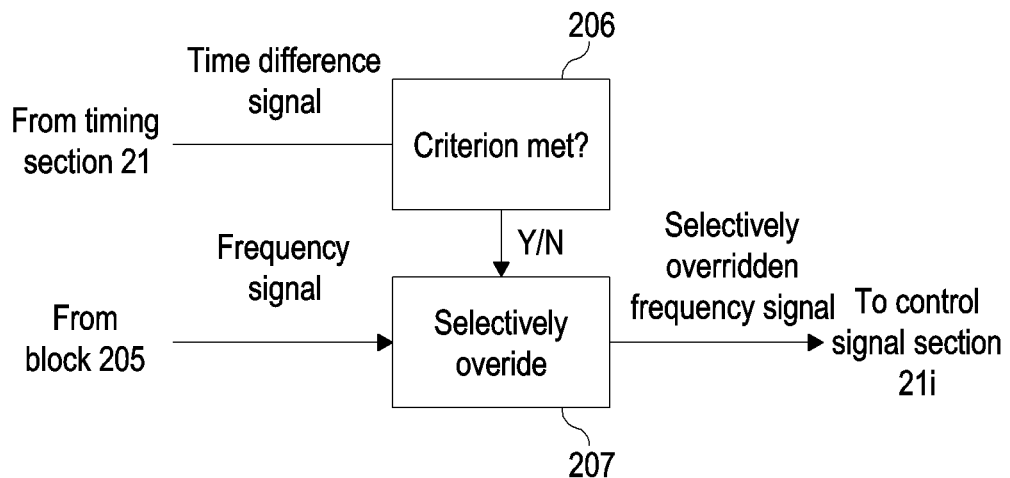
FIG. 9 schematically illustrates a second set of operations optionally performed by the controller in the converter of FIG. 1.

Referring in particular to FIG. 9, the processor 21e may optionally perform a second set of operations based on the time difference signal. These operations (hereinafter referred to as 'override operations') are illustrated schematically by the blocks 206, 207.

At a sixth block 206, the processor 21e determines whether the time difference signal from the timing section 21i meets any of a set of criteria (hereinafter referred to as the 'override criteria').

At a seventh block 207, the processor 21e selectively overrides the frequency signal, which, as explained above, is produced by the fifth block 205. In particular, the processor 21e at least partly overrides (or stops overriding) the frequency signal if it is determined at the sixth block 206 that one of the override criteria is met.

The (selectively-overridden) frequency signal is then provided to the control signal section 21i and, as explained above, determines the switching frequency of the switch network 2. Hence overriding the frequency signal affects the output of the converter 1. As will now be explained, the output of the converter 1 can be stopped or limited in appropriate circumstances.

In this example, the override criteria include three ('first', 'second' and 'third') criteria.

The first criterion is the time difference signal indicating that the time difference between the resonant current and the driving voltage is less than a particular amount (hereinafter referred to as the 'minimum time difference'), indicating that the resonant network 3 is close to being in a capacitive mode. As will be appreciated, a capacitive mode is associated with a change from soft switching to hard switching which may lead to increased losses and/or failure of the switches 2a, 2b. The minimum time difference may have any suitable value, which may be predetermined.

If the first criterion is met, then the frequency signal is changed so as to increase the switching frequency of the switch network 2.

This is preferably carried out incrementally. In particular, the frequency signal is preferably changed so as to increase the switching frequency or decrease the switching period by a particular amount (hereinafter referred to as the 'first increment'), and such a change is repeated e.g. whenever a time difference value is less than the minimum time difference. Thus, if the time difference values remain below the minimum time difference for some time, then the switching frequency will increase incrementally until it reaches a maximum switching frequency of the switch network 2. The first increment may have any suitable value, which may be predetermined. By way of example only, the first increment may correspond to a decrease in the switching period of the order of 1 µs.

In some examples, if the first criterion is met, then the frequency signal may be changed so as to directly set the frequency to a particular level (hereinafter referred to as the 'first level'). The first level may be any frequency between a higher resonant frequency of the resonant network 3 and the maximum switching frequency.

In some examples, if the first criterion is met, then the frequency signal may initially be changed so as to increase the switching frequency by the first increment. If this is not sufficient to increase the switching frequency above the higher resonant frequency of the resonant network 3, then the frequency may be set to the first level. Such a situation can occur if the converter 1 is operating at very low switching frequencies.

Changing the frequency signal in such ways will have the effect of inhibiting the resonant network 3 from entering a capacitive mode and may be stopping or limiting the output current. This is regardless of any phase-mode control operations.

The second criterion is the time difference signal indicating that the time difference between the resonant current and the driving voltage has decreased particularly rapidly. The inventors have observed that a sudden change in the load 100 (such as a short circuit of the main output 1b, the application of a capacitive load, an overload, etc.) causes the time difference between the resonant current and the driving voltage to also change (i.e. decrease) suddenly. This enables the detection of short circuits as described herein.

To determine whether the second criterion has been met, the processor 21e preferably determines whether the time difference signal has decreased by at least a particular amount (hereinafter referred to as the 'decrease threshold') in a particular period of time. The period of time is preferably the period of the resonant current/driving voltage, i.e. the switching period. Accordingly, the processor 21e may store a previous value of the time difference signal and may compare a present value of the time difference signal with the stored value. In some examples, the processor 21e may perform a more complex comparison, e.g. involving filtering, etc. The decrease threshold is preferably a predetermined value which, by way of example only, may be ~0.4 µs. In some examples, the decrease threshold may be a percentage of the switching period and/or the time lag.

If the second criterion is met, then the frequency signal is changed so as to increase the switching frequency of the switch network 2.

Again, this is preferably carried out incrementally. In particular, the frequency signal is changed so as to increase the switching frequency or decrease the switching period by a particular amount (hereinafter referred to as the 'second increment'), and such a change is repeated e.g. whenever the time difference values have decreased by more than the decrease threshold. The second increment is preferably a predetermined value and preferably corresponds to a less rapid increase in the switching frequency compared to that brought about by the first increment (described above). By way of example only, the second increment may correspond to a decrease in the switching period of the order of 100 ns (which may correspond to several (e.g. 6) cycles of the internal clock of the controller 21).

In some examples, there may be a set of two or more different decrease thresholds, each of which is associated with a different second increment. For example, there may be a ('first') smaller decrease threshold associated with a ('first') increment corresponding to a smaller increase in the switching frequency, and a ('second') larger decrease threshold associated with a ('second') increment corresponding to a larger increase in the switching frequency.

In some examples, if the second criterion is met, then the frequency signal may be changed so as to directly set the frequency to a particular level (hereinafter referred to as the 'second level'), which is preferably the maximum switching frequency but may also be a suitable lower switching frequency.

Changing the frequency signal in such a way will have the effect of stopping or limiting the output current, regardless of any phase-mode control operations.

With the second criterion, the controller 21 can implement high-speed (i.e. low-delay) over-current protection by detecting the time difference between the resonant current and the driving voltage. This time difference responds relatively quickly to changes in relation to the converter 1, e.g. to changes in load impedance and hence output current.

This can be exploited to provide higher-speed over-current protection mechanism compared, for example, to conventional mechanisms which involve measuring current.

Figure 10:
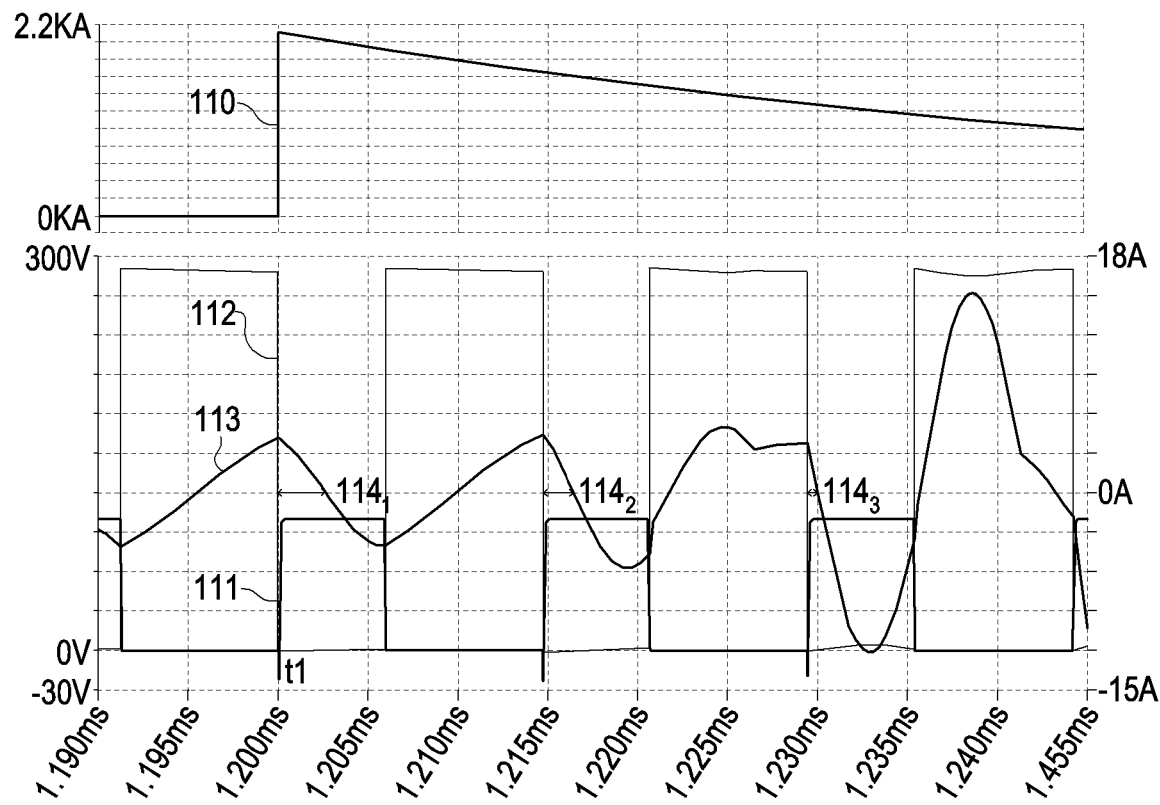
FIG. 10 shows simulated traces corresponding to output current, control signal, driving voltage and resonant current for a converter of the type shown in FIG. 1 operated at a fixed switching frequency and subject to a sudden large increase in output current.

FIG. 10 shows various simulated traces for a converter of the type described herein operated at a fixed switching frequency. A trace 110 corresponds to the output current, another trace 111 corresponds to the second control signal, another trace 112 corresponds to the driving voltage, and another trace 113 corresponds to the resonant current. As can be seen, at a particular time $t_1$, the output current increases sharply, corresponding to a short circuit of the load. The first time lag (represented by the arrow $114_1$) after $t_1$ has a particular value which in this example is ~2.5 μs, i.e. about a quarter of the switching period (corresponding to a relatively low load condition). After one switching period, the time lag (represented by the arrow $114_2$) has decreased significantly by about a half to ~1.25 μs. In contrast, the maximum value of the resonant current during the switching period (hereinafter referred to as the 'peak current') has changed by a relatively small amount over the same time (from ~4 to ~4.5 A). These results demonstrate the effectiveness of using the time difference signal for high-speed over-current protection. A converter that used peak current would not detect a short circuit (or sudden load change) until e.g. the third or even fourth cycle after the short circuit occurred. In contrast using the time lag enables the converter to detect a short circuit (or a sudden load change) within e.g. the first two cycles of the short circuit having occurred.

The third criterion is that, firstly, the frequency signal is presently being overridden due to the first or second criterion having been met and, secondly, the time difference signal indicating that the time difference between the resonant current and the driving voltage has increased at at least a particular rate. For example, such a change is indicative that an apparent short circuit has been removed.

Amongst other things, the processor 21e may determine whether the third criterion has been met by determining whether the time difference signal has increased by at least a particular amount (hereinafter referred to as the 'increase threshold') in a particular period of time (which is preferably the switching period). This may be carried out in an equivalent way to the second criterion (described above).

If the third criterion is met, then the processor 21e stops overriding the frequency signal.

Again, this is preferably carried out incrementally. In particular, the frequency signal (which is being at least partly overridden due to the first or second criterion having been met) is further changed so as to decrease the switching frequency or increase the switching period by a particular amount (hereinafter referred to as the 'third increment'), and such a change is repeated e.g. whenever the time difference values have increased by more than the increase threshold. The change(s) in the frequency signal when the third criterion is met counteract the change(s) due to the first or second criterion having been met. The third increment may have any suitable value, which may be predetermined. The third increment preferably brings about a less rapid decrease in the switching frequency compared to the increase brought about by the first or second increment. Hence it generally takes a number of switching periods to stop overriding the frequency signal and for the frequency signal to return to that produced by the fifth block 205.

Hence the converter 1 can automatically recover from various situations including, for example, a temporary apparent short circuit that can occur when a large capacitor is suddenly connected to the main output 1b.

Override Operations in Other Types of Converter

The above described override operations may be performed in other types of converter.

For example, the override operations may be performed in converters that do not use phase-mode control but instead use average current-mode control, peak current-mode control, charge control, etc.

Furthermore, the override operations may be performed in converters that use voltage-mode control, e.g. which do not have an inner loop as described herein. In such examples, instead of a current demand signal, the outer loop produces a signal corresponding to a voltage error signal. The voltage error signal may be used directly to determine a frequency signal, which may be selectively overridden as described herein.

In these examples, the controller 21 may use any suitable method of generating the frequency signal based on the current demand signal or voltage error signal (or equivalents of these signals). The converter 1 may include different hardware and/or software components to enable this to be carried out, while still including components needed to obtain the time difference signal, e.g. the circuitry for obtaining the resonant current timing signal and the timing section 21g.

Further Variations

It will be appreciated that there may be many further variations of the above described examples.

For instance, the converter 1 may seek to provide a dc output with a particular output current.

Operations described as being carried out by a particular component of the converter 1 may be carried out by a different component.

Analogue signals may be replaced by digital signals and vice versa.

The resistor 11 and the comparator 12 may form part of the controller 21.

The outer loop 20 rather than the inner loop 10 may determine the phase demand signal.

The timing of the resonant current and/or the driving voltage may be determined in a different way. For example, the controller 21 may have a further input for directly sensing the driving voltage (e.g. at the midpoint 2c of the switch network 2). Other parts of the waveform (e.g. rising edges of the driving voltage and upwards zero-crossings of the resonant current, etc.) may be used.

The relevant phase difference may alternatively or additionally be changed by changing the duty cycle of the control signals.

'Overriding' the frequency signal may involve the processor 21e stopping its determination of the frequency signal using phase-mode control.

The first and/or second levels (used in the override operations) may be zero, i.e. corresponding to no switching.

The processor 21e may use the phase signal (determined at the first block 201) rather than the time difference signal in determining whether or not to override the frequency signal. However, using the time difference signal directly without needing to determine the phase signal is faster and so is generally preferable.

The frequency signal may be made up of any suitable values, e.g. values relating to switching period.

Different action(s) may be taken at the seventh block 207 if the time difference signal meets a particular criterion.

The override operations may have applications in devices other than dc-dc converters.

The invention claimed is:

1. Apparatus for facilitating emulated current-mode control of a resonant converter, the apparatus comprising:
    a first input for a first signal suitable for use in determining a phase of a resonant current, wherein the resonant current corresponds to a current in a resonant network of the converter;
    a second input for a second signal suitable for use in determining a target phase difference between the resonant current and a driving voltage, wherein the driving voltage corresponds to a voltage provided by a switch network of the converter to the resonant network;
    one or more outputs for one or more control signals for controlling operation of the switch network; and
    circuitry configured to:
        use the first signal in determining a first value, wherein the first value is related to a phase difference between the resonant current and the driving voltage;
        use the second signal in determining a second value, wherein the second value is related to the target phase difference; and
        set the one or more control signals based at least in part on a comparison of the first and second values, wherein the one or more control signals are for varying the switching frequency of the switch network for causing the phase difference to follow the target phase difference such that an output current of the converter follows a target output current.

2. Apparatus according to claim 1 wherein the first signal is indicative of a timing of zero-crossings of the resonant current.

3. Apparatus according to claim 1 wherein the circuitry is configured to determine the first value using the first signal and at least one of the one or more control signals.

4. Apparatus according to claim 1 comprising:
    a third input for a third signal suitable for use in determining a phase of the driving voltage;
    wherein the circuitry is configured to determine the first value using the first signal and the third signal.

5. Apparatus according to claim 1 wherein the circuitry is configured to determine the first value based on:
    a value indicative of a time difference between a zero-crossing of the resonant current and a zero-crossing of the driving voltage; and
    a value indicative of a period of the resonant current and the driving voltage.

6. Apparatus according to claim 5 wherein the circuitry is configured to determine the value indicative of the period in accordance with a frequency of operation of the switch network set by the circuitry.

7. Apparatus according to claim 5 wherein the circuitry is configured to adjust the value indicative of the time difference so as to overestimate a time lag of the resonant current with respect to the driving voltage, and further configured to determine the first value based on the adjusted value indicative of the time difference.

8. Apparatus according to claim 1 wherein the circuitry is configured to constrain the second value to a particular range, the range corresponding to a phase lag of the resonant current with respect to the driving voltage being greater than zero.

9. Apparatus according to claim 1 wherein the second signal is indicative of the target output current of the converter and wherein the circuitry is configured to determine the second value in accordance with a known relationship between the output current and the phase difference between the resonant current and the driving voltage.

10. Apparatus according to claim 1 wherein the one or more control signals are suitable for changing an operating frequency and/or a duty cycle of the switch network.

11. Apparatus according to claim 1 wherein the circuitry comprises at least one processor and non-transitory memory storing computer programme code, wherein the computer programme code, when executed by the at least one processor, causes the circuitry to set the one or more control signals.

12. A resonant converter with control circuitry comprising:
    an inner loop comprising the apparatus according to claim 1; and an outer loop configured to sense an output level of the converter and to produce a signal corresponding to the second signal,
    wherein the inner and outer loops cause an output level of the converter to tend towards a target output level.

13. A method suitable for use in a resonant converter, the method comprising:
    obtaining a first signal or first value suitable for use in determining timing of a resonant current, wherein the resonant current corresponds to a current in a resonant network of the converter;
    obtaining a second signal or second value suitable for use in determining timing of a driving voltage, wherein the driving voltage corresponds to a voltage provided by a switch network of the converter to the resonant network;
    using the first signal or first value and the second signal or second value in determining at least one third value related to a time difference between the resonant current and the driving voltage; and,
    in response to the at least one third value meeting one or more criteria, at least partly overriding one or more control signals, wherein the one or more control signals are for varying a switching frequency of the switch network and are otherwise determined so as to set an output current of the resonant converter to follow a target output current.

14. The method according to claim 13 wherein the one or more criteria include:
the at least one third value indicating that the time difference is less than a minimum time difference.

15. The method according to claim 13 wherein the one or more criteria include:
the at least one third value indicating that the time difference has decreased by at least a particular amount in a particular period of time.

16. The method according to claim 14 wherein overriding the one or more control signals comprises:
changing the one or more control signals so as to increase the time difference and/or reduce the output of the resonant converter.

17. The method according to claim 15 wherein overriding the one or more control signals comprises:
changing the one or more control signals so as to incrementally increase the switching frequency of the switch network.

18. The method according to claim 16 wherein overriding the one or more control signals comprises:
changing the one or more control signals so as to set the switching frequency of the switch network to a particular frequency.

19. The method according to claim 13 comprising:
in response to the at least one third value meeting a further criterion, stopping overriding the one or more control signals, wherein the further criterion corresponds to the at least one third value indicating that the time difference has increased by a particular amount in a particular period of time.

20. The method according to claim 19 wherein stopping overriding the one or more control signals comprises:
changing the one or more control signals so as to incrementally decrease the switching frequency of the switch network.

* * * * *